United States Patent [19]

Espinosa

[11] Patent Number: 5,683,134
[45] Date of Patent: Nov. 4, 1997

[54] VEHICLE SOLAR RADIATION SHIELD

[76] Inventor: Rodolfo Espinosa, 448 South Hills St., Los Angeles, Calif. 90013

[21] Appl. No.: 632,609

[22] Filed: Apr. 15, 1996

[51] Int. Cl.$^6$ ........................................................ B60J 3/02
[52] U.S. Cl. ............................................................ 296/97.8
[58] Field of Search ................................ 296/97.8, 97.5

[56] References Cited

U.S. PATENT DOCUMENTS

| | | | |
|---|---|---|---|
| 3,584,910 | 6/1971 | Lupul | 296/97.8 |
| 5,098,149 | 3/1992 | Lee | 296/97.8 |
| 5,133,585 | 7/1992 | Hassan | 296/97.8 |
| 5,213,389 | 5/1993 | Loftis et al. | 296/97.8 |
| 5,443,923 | 8/1995 | Laniado et al. | 296/97.8 |

FOREIGN PATENT DOCUMENTS

| | | | |
|---|---|---|---|
| 432502 A1 | 1/1995 | Germany | 296/97.8 |
| 119416 | 5/1989 | Japan | 296/97.8 |

Primary Examiner—Gary C. Hoge
Attorney, Agent, or Firm—Erik M. Arnhem

[57] ABSTRACT

A solar radiation shield includes a flexible shade assembly mounted on an automotive vehicle sun visor to prevent solar radiation from reaching interior surfaces of the vehicle when the vehicle is left standing in the sun for a protracted time period. The shade assembly includes a rotary spindle and a flexible sheet spirally wound on the spindle so that the sheet can be manually unrolled from the spindle to span the inner surface of the vehicle windshield. During normal operation of the vehicle the flexible sheet is wound onto the spindle so that the sun visor is enabled to perform in conventional fashion.

2 Claims, 1 Drawing Sheet

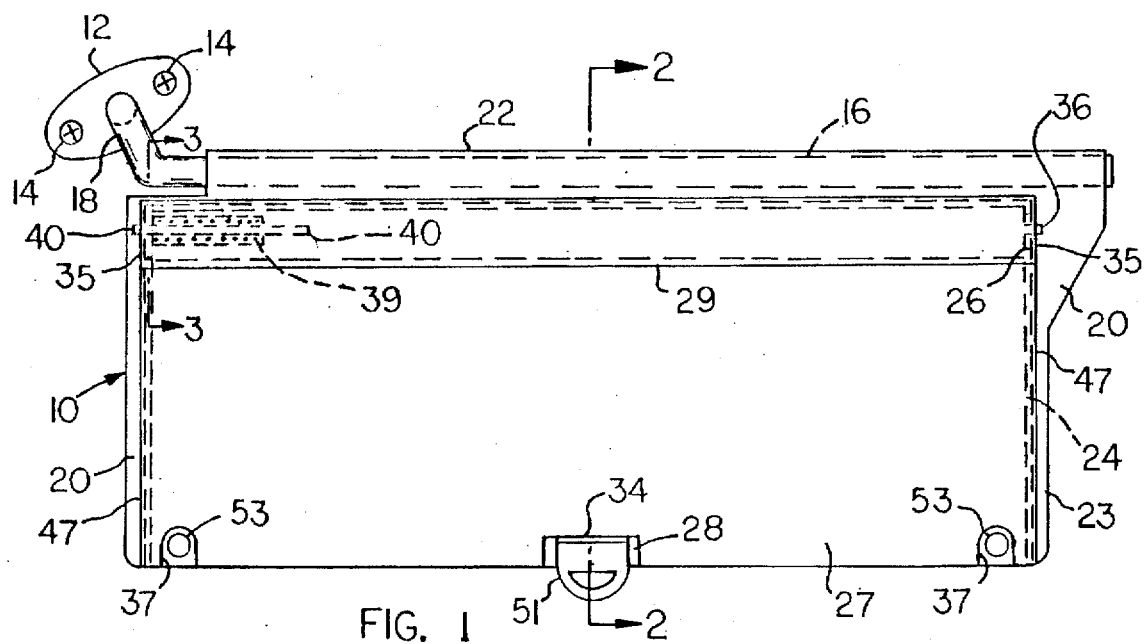
FIG. 1
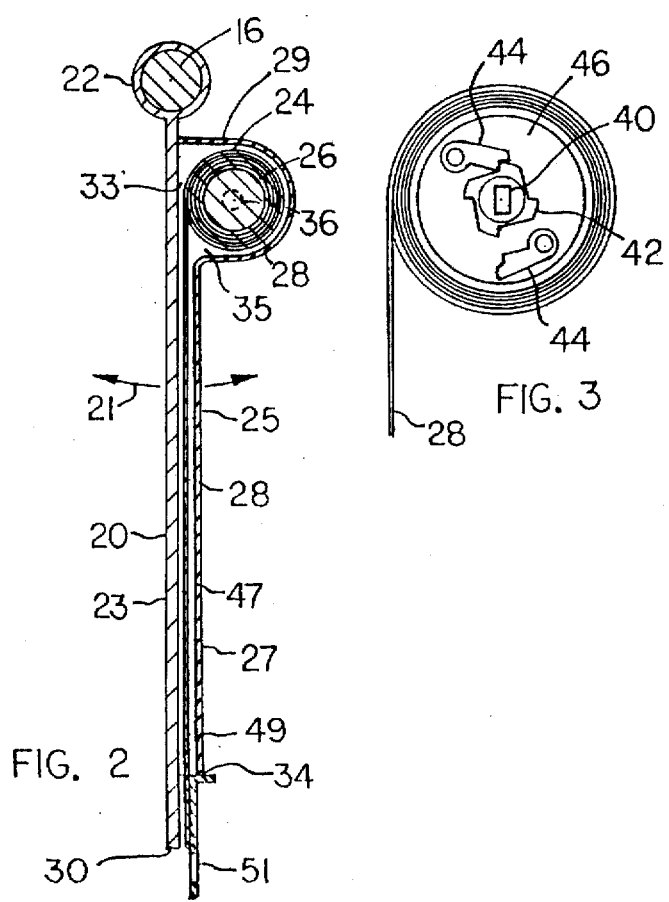
FIG. 2
FIG. 3

VEHICLE SOLAR RADIATION SHIELD

BACKGROUND AND SUMMARY OF THE INVENTION

This invention relates to a solar radiation shield adapted for installation in an automotive vehicle to prevent sun rays from unduly heating the vehicle interior when the vehicle is unoccupied, e.g. when the vehicle is left in a parking lot for an extended period of time.

Solar radiation shields of a portable nature are sometimes used to prevent solar radiation from unduly heating the vehicle interior surfaces, such as the steering wheel or the dashboard. A portable sun shield can take the form of a cardboard sheet adapted for placement in a vehicle directly behind the vehicle windshield to intercept incoming sun rays before such rays can heat vehicle interior surfaces.

U.S. Pat. No. 5,409,284, to G. Mahler, shows a sun shield built into the roof interior of a vehicle so as to be extendable downwardly along one of the vehicle side windows. The sun shield comprises a fabric sheet wound on a shaft, and having a lower edge thereof attached to an arcuate frame, whereby movement of the frame downwardly along the vehicle window draws the fabric sheet downwardly to an active position. The frame has rack teeth that are in mesh with two motor-driven gears at opposite sides edges of the frame.

U.S. Pat. No. 4,776,628 shows a sun visor having an auxiliary panel slidably extending through a slit in the visor. The panel can be pulled downwardly through the slit to slightly increase the effective size of the sun visor.

U.S. Pat. 5,206,764, issued to M. Lamoglia, relates to a sun visor mirror having a hollow interior that is occupied by a slidable glare screen. The screen can apparently be extended from the edge of the mirror, either horizontally or vertically, at the user's option.

The present invention relates to a sun shield mechanism that includes a conventional sun visor having a rotary shade assembly thereon. The shade assembly comprises a spindle having a flexible sheet spirally wound thereon so as to be unrollable to a condition spanning the vehicle windshield.

A principal advantage of the invention is that the flexible sheet can be extended downwardly for a considerable distance beyond the lower edge of the sun visor. The shade assembly is relatively compact in the rolled-up condition, while occupying a considerable area in the unwound (extended) condition. An aim of the invention is to achieve a reasonably complete coverage of the windshield, without interferring with normal operation of the sun visor.

Further advantages and features of the invention will be apparent from the attached drawings and description of a representative embodiment of the invention.

THE DRAWINGS

FIG. 1 is a front elevational view of a solar radiation shield mechanism embodying the invention.

FIG. 2 is an enlarged sectional view taken on line 2—2 in FIG. 1.

FIG. 3 is an end view of a shade assembly used in the FIG. 1 embodiment. FIG. 3 is taken in the direction designated by arrows 3—3 in FIG. 1.

DESCRIPTION OF A PREFERRED EMBODIMENT OF THE INVENTION

FIG. 1 shows a sun visor 10 adapted for installation in an automotive vehicle. The visor comprises a mounting bracket 12 having two attachment screws 14 for fastening the bracket to a vehicle interior roof surface at a front corner of the vehicle. Bracket 12 provides a hinge connection between the sun visor and the vehicle, whereby the visor can be swung between a normal operating position extending along the vehicle windshield and a second operating position extending along the vehicle side window.

The visor comprises an elongated rod 16 having a turned end portion 18 extending into the mounting bracket. End portion 18 will have a swivel fit in bracket 12, whereby rod 16 can swing in a horizontal arc between its two operating positions.

Sun visor 10 further comprises a panel 20 that includes a sleeve portion 22 encircling rod 16, such that the panel can swing around the rod axis, as indicated by arrow 21 in FIG. 2. The panel can be swung upwardly around rod 16 to an inactive position lying against the interior surface of the vehicle roof. Alternately, panel 20 can be swung downwardly to a depending position for shielding the vehicle occupant's eyes while he or she is sitting in the vehicle (as a passenger or as the driver).

FIG. 1 is a front view of a passenger sun visor looking through the vehicle front windshield. The driver's sun visor would be a mirror image of the FIG. 1 visor. The invention is particularly concerned with a shade assembly 24 mounted within panel 20 to provide an extended sun shield for the steering wheel and dash area of the vehicle when the vehicle is left unattended, e.g. in a parking lot.

Shade assembly 24 comprises a rotary spindle 26 located near the upper edge of panel 20 slightly below rod 16, and a flexible sheet 28 spirally wound on spindle 26, whereby the flexible sheet can be unrolled from the spindle to extend downwardly below the visor lower edge 30 a substantial distance. Shade assembly 24 is a miniature version of the conventional window shade already known in the art.

Sun visor panel 20 comprises a primary plate 23 having the aforementioned sleeve 22 extending along its upper edge, and a secondary housing element 25 secured to the front face of plate 23 for enclosing the above-mentioned shade assembly 24. Housing element 25 comprises a major planar wall 27 extending generally parallel to plate 23, and a generally cylindrical tube-like section 29 extending along the upper edge of planar wall 27 to enclose the rolled-up portion of the flexible sheet 28, that forms part of shade assembly 24. Housing element 25 has narrow end walls 47 that are attached to plate 23 to space planar wall 27 from plate 23. The flexible sheet 28 extends downwardly in the space between plate 23 and planar wall 27.

Flexible sheet 28 is rolled onto a spindle 26 located within cylindrical housing section 29. The right end of spindle 26 has a circular pin 36 extending through the associated end wall 47. The left end of spindle 26 forms a cavity that houses a helical torsion spring 39, whereby the spindle is normally biased to a condition wherein sheet 28 is in a rolled-up position on the spindle.

One end of spring 39 is anchored to spindle 26, whereas the other end of the spring is anchored to an elongated pin 40 that is non-rotatably connected to an associated housing end wall 47 (at the end of spindle 26). As shown in semi-schematic fashion in FIG. 3, pin 40 carries a circular ratchet 42 that is in registry with two swingable pawls 44 carried on an end cap 46 of the spindle 26. Pawls 44 serve a latching function, to hold the shade element 28 in various extended positions against the biasing action of spring 39.

The sun visor comprises two housing end walls 47 that extend downwardly along plate 23 to enclose the side edges of sheet 28. Sheet 28 extends downwardly so that its lower edge is at the same level as the lower edges of plate 30 and housing wall 27 (when sheet is retracted into the sun visor as shown in FIGS. 1 and 2).

The lower leading edge of sheet 28 carries a hand grip 51 that is engageable with an upwardly recessed edge 34 on housing wall 27, to limit upward movement of the sheet toward spindle 26. FIGS. 1 and 2 show the sheet 28 in its limiting position fully retracted onto spindle 26; hand grip 51 abuts edge 34 on wall 27 to prevent any further upward motion of sheet 28 beyond the position shown in FIGS. 1 and 2.

Hand grip 51 is accessible to the occupant of the vehicle, whereby sheet 28 can be pulled manually downwardly from its FIG. 1 position. Sheet 28 can thereby be extended to span the vehicle windshield, to provide a sun shield when the vehicle is left unattended. Sheet 28 occupies minimal space in its rolled-up condition on spindle 26. However, when sheet 28 is pulled downwardly it will provide a substantial area coverage of the windshield.

Typically, the sun visor panel 20 will have a length of about nineteen inch and a vertical width dimension of about seven inch.

A typical vehicle windshield has a vertical slant dimension of about twenty seven inch. When sheet 28 is pulled downwardly from its illustrated position it can provide substantial area coverage of the windshield; the lower edge of sheet 28 can be brought down to a point in near proximity with the lower limit of the windshield.

As an optional feature of the invention, sheet 28 can be equipped with suction cups 53 near its lower edge. By temporarily sticking these suction cups to the inner surface of the windshield, it becomes possible for sheet 28 to closely conform to the windshield contour, thereby enhancing the solar protection shield action. The lower edge of housing wall 27 is recessed, as at 37, to accommodate suction cups 37 when the flexible sheet 28 is in its retracted position.

Spindle 26 is preferably located near the upper edge of panel 20, near the pivot rod 16 axis. The spindle therefore has a minimal loading that might interfere with normal swinging motion of the sun visor. The sun visor can be operated in the normal usual fashion. When it becomes necessary to shield the vehicle interior surfaces from the solar rays, the handgrip 51 can be pulled to bring the sheet 28 downwardly along the inner surface of the windshield (or the side window if so desired). Sheet 28 is normally located within the sun visor so as to be substantially concealed from view. The sun visor has essentially the same appearance as a conventional sun visor. At the same time, hand grip 51 is readily accessible to the vehicle occupant when it becomes necessary to pull sheet 28 downwardly into its solar protection position.

The drawings show one particular form of the invention. However, it will be understood that the invention can be practiced in various forms and configurations.

What is claimed is:

1. A mechanism for shielding the interior of an automotive vehicle from solar radiation, comprising a sun visor located within a vehicle in near proximity to the vehicle windshield, said visor having a front surface adapted to face the windshield; and;

a shade assembly mounted on said visor; said shade assembly comprising a spindle, and a flexible sheet spirally wound on said spindle, whereby said flexible sheet can be unrolled from the spindle to extend downwardly below the visor a substantial distance;

said sun visor comprising a flat plate having an upper edge and a lower edge, and a horizontal suspension rod (16) extending along the upper edge of said plate, whereby said plate can be swung around the rod axis to an inactive position lying against the vehicle roof interior; said sun visor further comprising a shade element housing secured to said flat plate to normally enclose said flexible sheet;

said spindle being rotatably supported in said shade element housing in near proximity to the upper edge of the flat plate so that the unrolled portion of said sheet normally extends downwardly along said plate; said shade element housing comprising a flat planar wall spaced from said flat plate to accommodate the unrolled portion of said flexible sheet, and a hollow tube-like section (29) enclosing said spindle;

said spindle having a spring means (39) normally biasing said spindle to a condition wherein said sheet is in a rolled-up condition on the spindle and the flat plate.

2. The mechanism of claim 1, wherein said flat planar wall has a lower edge; said flexible sheet having a lower edge and a hand grip (51) secured thereto for abutment against the lower edge of said planar wall, to limit upward motion of said flexible sheet.

\* \* \* \* \*